US010029662B2

(12) United States Patent
Ninoyu et al.

(10) Patent No.: US 10,029,662 B2
(45) Date of Patent: Jul. 24, 2018

(54) VEHICLE BRAKE DEVICE

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Masaki Ninoyu, Obu (JP); Takahiro Okano, Chiryu (JP); Yoshio Masuda, Anjyo (JP); Daisuke Nakata, Seto (JP)

(73) Assignees: ADVICS CO., LTD, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 119 days.

(21) Appl. No.: 15/128,206

(22) PCT Filed: Jan. 8, 2015

(86) PCT No.: PCT/JP2015/050410
§ 371 (c)(1),
(2) Date: Sep. 22, 2016

(87) PCT Pub. No.: WO2015/146216
PCT Pub. Date: Oct. 1, 2015

(65) Prior Publication Data
US 2017/0120882 A1 May 4, 2017

(30) Foreign Application Priority Data
Mar. 25, 2014 (JP) ................ 2014-061707

(51) Int. Cl.
*B60T 13/14* (2006.01)
*B60T 7/04* (2006.01)
(Continued)

(52) U.S. Cl.
CPC ............ *B60T 13/146* (2013.01); *B60T 7/042* (2013.01); *B60T 8/40* (2013.01); *B60T 8/4077* (2013.01); *B60T 13/686* (2013.01)

(58) Field of Classification Search
CPC .......... B60T 13/146; B60T 7/042; B60T 8/40; B60T 8/4077; B60T 13/686
See application file for complete search history.

(56) References Cited

U.S. PATENT DOCUMENTS

2011/0285199 A1 11/2011 Ishida
2013/0167716 A1 7/2013 Uechi et al.
(Continued)

FOREIGN PATENT DOCUMENTS

JP 2011-240873 A 12/2011
JP 2012-066692 A 4/2012
(Continued)

OTHER PUBLICATIONS

International Search Report (PCT/ISA/210) dated Mar. 10, 2015, by the Japanese Patent Office as the International Searching Authority for International Application No. PCT/JP2015/050410.
(Continued)

*Primary Examiner* — Melanie Torres Williams
(74) *Attorney, Agent, or Firm* — Buchanan Ingersoll & Rooney PC

(57) ABSTRACT

A vehicle brake device includes a pressure adjusting device wherein as the volume of a pilot chamber is changed by the movement of a piston and the flow rate of liquid flowing in and out of the pilot chamber increases, the amount of movement of the piston increases with reference to the piston position in an equilibrium state where the force corresponding to the pilot pressure and the force corresponding to the output pressure are balanced, whereby the flow rate of the liquid flowing in and out of an output chamber increases. A control device, when judged by a limitation necessity judging portion that the gradient of output pressure should be limited, implements at least one of pressure increasing gradient limit control for opening a pressure decreasing electromagnetic valve under pressure increasing control, or pressure decreasing gradient limit control for opening a pressure increasing electromagnetic valve under pressure decreasing control.

7 Claims, 5 Drawing Sheets

(51) Int. Cl.
  *B60T 13/68* (2006.01)
  *B60T 8/40* (2006.01)

(56) References Cited

U.S. PATENT DOCUMENTS

| | | |
|---|---|---|
| 2014/0327296 A1 | 11/2014 | Ishida |
| 2015/0015061 A1 | 1/2015 | Masuda et al. |
| 2015/0120161 A1* | 4/2015 | Kamiya et al. |

FOREIGN PATENT DOCUMENTS

| | | |
|---|---|---|
| JP | 2013-193619 A | 9/2013 |
| JP | 2013-216177 A | 10/2013 |
| JP | 2014-046767 A | 3/2014 |

OTHER PUBLICATIONS

Written Opinion (PCT/ISA/237) dated Mar. 10, 2015, by the Japanese Patent Office as the International Searching Authority for International Application No. PCT/JP2015/050410.
Office Action dated Mar. 30, 2018 by the State Intellectual Property Office of People's Republic of China in corresponding Chinese Patent Application No. 201580015713.8 and an English Translation of the Office Action. (11 pages).

* cited by examiner

CYLINDER OPENING SIDE ←——→ CYLINDER BOTTOM SURFACE SIDE

VEHICLE BRAKE DEVICE

TECHNICAL FIELD

This invention relates to a vehicle brake device.

BACKGROUND ART

Conventionally, a vehicle brake device is known which is, for example, equipped with a master cylinder, an output piston which varies the volume of a master chamber by being driven by a force corresponding to a hydraulic pressure in a servo chamber, an input piston defining a first hydraulic pressure chamber filled with a brake fluid with the output piston and being movable in association with an operation of a brake operating member, a mechanical type servo pressure generating portion outputting a hydraulic pressure corresponding to the hydraulic pressure inputted in a pilot chamber into the servo chamber and a pilot pressure generating portion generating the hydraulic pressure corresponding to an inputted control signal in the pilot chamber. The vehicle brake device as described above is disclosed in a Japanese Patent Publication 2011-240873 A.

Further, as the mechanical type servo pressure generating portion, a mechanical type regulator for generating a hydraulic pressure corresponding to a pilot pressure in the servo chamber based on an accumulator pressure in an accumulator is disclosed in another Japanese Patent Publication 2013-193619 A.

As explained above, there exists a vehicle brake device which is equipped with a pressure adjusting device which outputs a servo pressure corresponding to the pilot pressure which is inputted to the pilot chamber to the servo chamber. Basically, the pressure adjusting device includes a piston which is driven by a force generated by a difference between the force corresponding to the pilot pressure and the force corresponding to the servo pressure and the volume of the pilot chamber is variable in response to the displacement of the piston. The servo pressure is one of the output pressures outputted in response to the pilot pressure.

CITATION LIST

Patent Literature

Patent Literature 1: JP2011-240873 A
Patent Literature 2: JP2013-193619 A

SUMMARY OF INVENTION

Technical Problem(s)

It is noted here that the inventors of this application found a point to be further improved (problem) in a vehicle brake device which is equipped with a pressure adjusting device. The problem is that if a control for making the flow rate of the liquid flowing into and out of the pilot chamber zero is executed (output pressure holding control) at a time when the actual output pressure (actual pressure of the output pressure) reaches approximately a target output pressure (target pressure of the output pressure), the piston may move thereafter in spite of the zero flow rate of the liquid and due to such movement of the piston, the actual output pressure deviates from the target output pressure (either overshooting or undershooting of the output pressure).

Accordingly, this invention was made in consideration with the above-mentioned situation and the objective of the invention is to provide a vehicle brake device which can suppress occurrence of an overshooting or an undershooting of the output pressure.

Solution to Problem(s)

The vehicle brake device according to a first aspect of the invention is characterized in that the vehicle brake device includes a pressure adjusting device configured to output an output pressure corresponding to a pilot pressure inputted into a pilot chamber into an output chamber, a high pressure configured to accumulate a hydraulic pressure in a predetermined range a low pressure source configured to accumulate a hydraulic pressure lower than the hydraulic pressure accumulated in the high pressure source, a pressure increasing electromagnetic valve configured to adjust a flow rate of a liquid flowing into the pilot chamber from the high pressure source, a pressure decreasing electromagnetic valve configured to adjust a flow rate of a liquid flowing into the low pressure source from the pilot chamber and a control means configured to control the pressure increasing electromagnetic valve and the pressure decreasing electromagnetic valve. The vehicle brake device further includes a limiting necessity judging means configured to judge whether a gradient of the output pressure should be limited or not, based on a target output pressure which is a control target of the control means and an actual output pressure correlation value which correlates with an actual output pressure, wherein the pressure adjusting device configured to include a piston driven by a force in difference between a force corresponding to the pilot pressure and a force corresponding to the output pressure, wherein a volume of the pilot chamber varies in response to a movement of the piston, a reference position of the piston being a position under a state that the force corresponding to the pilot pressure and the force corresponding to the output pressure are balanced and when the flow rate of the liquid flowing into or out of the pilot chamber increases, the movement of the piston from the reference position increases to thereby increase the flow rate of the liquid flowing into or out of the output chamber; and wherein the control means executes at least one of a pressure increasing gradient limiting control in which the pressure decreasing electromagnetic valve is opened under a pressure increasing control and a pressure decreasing gradient limiting control in which the pressure increasing electromagnetic valve is opened under a pressure decreasing control, when the limiting necessity judging means judges that the gradient of the output pressure should be limited.

According to the vehicle brake device structured above, when the limiting necessity judging means judges that the gradient (change amount per unit time) of the output pressure should be limited, the pressure decreasing electromagnetic valve is opened in spite of being under execution of the pressure increasing control when executing the pressure increasing gradient limiting control, and the pressure increasing electromagnetic valve is opened in spite of being under execution of the pressure decreasing control when executing the pressure decreasing gradient limiting control. Under the pressure increasing control, when the pressure decreasing electromagnetic valve is opened, the liquid flows out of the pilot chamber and flows into the low pressure source, thereby decreasing the pressure increasing gradient of the pilot pressure. As a result, the pressure increasing gradient of the output pressure is decreased. Further, the limiting necessity judging means can judge whether to limit or not from the viewpoint of the suppression of the overshooting. In other words, the pressure increasing gradient of the output pressure can be decreased at the timing that the overshooting can be suppressed. The overshooting is more apt to be generated when the pressure increasing gradient of the output pressure is large. However, according to the structure of the invention, the pressure increasing gradient of the output pressure can be suppressed and thereby the overshooting can be suppressed. Similarly, by suppressing the pressure decreasing gradient of the output pressure under the pressure decreasing control, the undershooting can be suppressed. The control means according to the invention executes only one of the pressure increasing gradient limiting control and the pressure decreasing gradient limiting control or executes both of the pressure increasing gradient limiting control and the pressure decreasing gradient limiting control.

The vehicle brake device according to a second aspect of the invention is characterized in that in the feature of the first aspect, the control means the control means opens the pressure decreasing electromagnetic valve when executing the pressure increasing gradient limiting control and opens the pressure increasing electromagnetic valve when executing the pressure decreasing gradient limiting control, respectively by an opening degree corresponding to a deviation between the target output pressure and the actual output pressure correlation value.

According to the structure of the second aspect, since the opening degree of the pressure decreasing electromagnetic valve or the pressure increasing electromagnetic valve is set corresponding to the difference in pressure between the target output pressure and the actual output pressure, for example, the opening degree is set to be large to make a decreasing rate of the pressure increasing gradient or the pressure decreasing gradient large when the difference in pressure is small and the opening degree is set to be small to make a decreasing rate of the pressure increasing gradient or the pressure decreasing gradient small when the difference in pressure is large. According to this structure of the invention, the opening degree of the pressure increasing electromagnetic valve or the pressure decreasing electromagnetic valve can be variably set depending on the difference between the target and actual output pressures and thereby the overshooting or the undershooting can be accurately suppressed.

The vehicle brake device according to a third aspect of the invention is characterized in that in the feature of the second aspect, the control means opens the pressure decreasing electromagnetic valve when executing the pressure increasing gradient limiting control and opens the pressure increasing electromagnetic valve when executing the pressure decreasing gradient limiting control, respectively by the opening degree further corresponding to a gradient of the output pressure.

According to the structure of the third aspect of the invention, the opening degree of the pressure decreasing electromagnetic valve or the pressure increasing electromagnetic valve is set corresponding to the difference between the target output pressure and the actual output pressure and the gradient of the output pressure. The larger the gradient of the output pressure is, the more the overshooting or the undershooting is apt to be generated. Accordingly, when the gradient of the output pressure is large, the opening degree of the pressure decreasing electromagnetic valve or the pressure increasing electromagnetic valve is set to be large to decrease the gradient so that the overshooting or the undershooting can be suppressed. In other words, according to this structure of the invention, by considering further the gradient of the output pressure with respect to the opening degree of the pressure increasing electromagnetic valve or the pressure decreasing electromagnetic valve, the overshooting or the undershooting can be accurately suppressed.

The vehicle brake device according to a fourth aspect of the invention is characterized in that in any one of the features of the first through third aspects, the vehicle brake device further includes an output pressure obtaining means configured to obtain an actual output pressure which is the pressure actually outputted, wherein the control means monitors the change of the actual output pressure obtained by the output pressure obtaining means while gradually increasing the opening degree of the pressure decreasing electromagnetic valve when executing the pressure increasing gradient limiting control or while gradually increasing the opening degree of the pressure increasing electromagnetic valve when executing the pressure decreasing gradient limiting control and closes the pressure increasing electromagnetic valve or the pressure decreasing electromagnetic valve in response to the change of the actual output pressure.

According to this structure of the fourth aspect of the invention, since the pressure decreasing electromagnetic valve or the pressure increasing electromagnetic valve is gradually opened, it can suppress an excess decrease of the pressure increasing gradient or the pressure decreasing gradient of the output pressure due to a sudden flowing-out of the liquid from the pilot chamber. Further, since the pressure decreasing electromagnetic valve or the pressure increasing electromagnetic valve is closed in response to the change of the actual output pressure, it can surely suppress a sudden decrease of the gradient of the output pressure. Accordingly, an excess drop of the actual output pressure relative to the target output pressure can be suppressed and thereby an appropriate braking control can be performed and the overshooting or the undershooting can be accurately suppressed.

The vehicle brake device according to a fifth aspect of the invention is characterized in that in the feature of any one of the features of the first through fourth aspects, the vehicle brake device further includes a valve opening time setting means configured to set a valve opening time of the pressure decreasing electromagnetic valve based on the deviation between the target output pressure and the actual output pressure correlation value, wherein the control means opens the pressure decreasing electromagnetic valve by the valve opening time when executing the pressure increasing gradient limiting control.

Further, the vehicle brake device according to a sixth aspect of the invention is characterized in that in the feature of any one of the features of the first through fifth aspects, the vehicle brake device further includes a valve opening time setting means configured to set a valve opening time of the pressure increasing electromagnetic valve based on the deviation between the target output pressure and the actual output pressure correlation value, wherein the control means opens the pressure increasing electromagnetic valve by the valve opening time when executing the pressure decreasing gradient limiting control.

The smaller the deviation between the target output pressure and the actual output pressure is, the more the overshooting or the undershooting is apt to be generated, and the larger the deviation is, the less the overshooting or the undershooting is apt to be generated. The flow rate of the liquid flowing out of the pilot chamber (decrease ratio of the gradient of the pilot pressure) depends on the opening degree and the valve opening time of the pressure decreasing electromagnetic valve or of the pressure increasing electromagnetic valve. According to the structure of the invention, since the valve opening time is set based on the deviation between the target output pressure and the actual output pressure, for example, by setting the valve opening time longer as the deviation is smaller, the gradient of the output pressure can be largely decreased. Oppositely, the larger the deviation is, the smaller the valve opening time can be set. In other words, an appropriate gradient control in response to the deviation can be achieved and the overshooting or the undershooting can be accurately suppressed.

According to the structure of a seventh aspect of the invention, in the feature of the fifth or the sixth aspect, the valve opening time setting means is configured to set the valve opening time further based on the gradient of the output pressure. The larger the gradient of the output pressure is, the more the overshooting or the undershooting is apt to be generated. According to the structure of the invention, since the valve opening time is set in consideration of the gradient of the output pressure as similar to the opening degree of the pressure decreasing electromagnetic valve or the pressure increasing electromagnetic valve, the overshooting or the undershooting can be accurately suppressed.

BRIEF EXPLANATION OF ATTACHED DRAWINGS

EMBODIMENTS FOR IMPLEMENTING INVENTION

Figure 1:
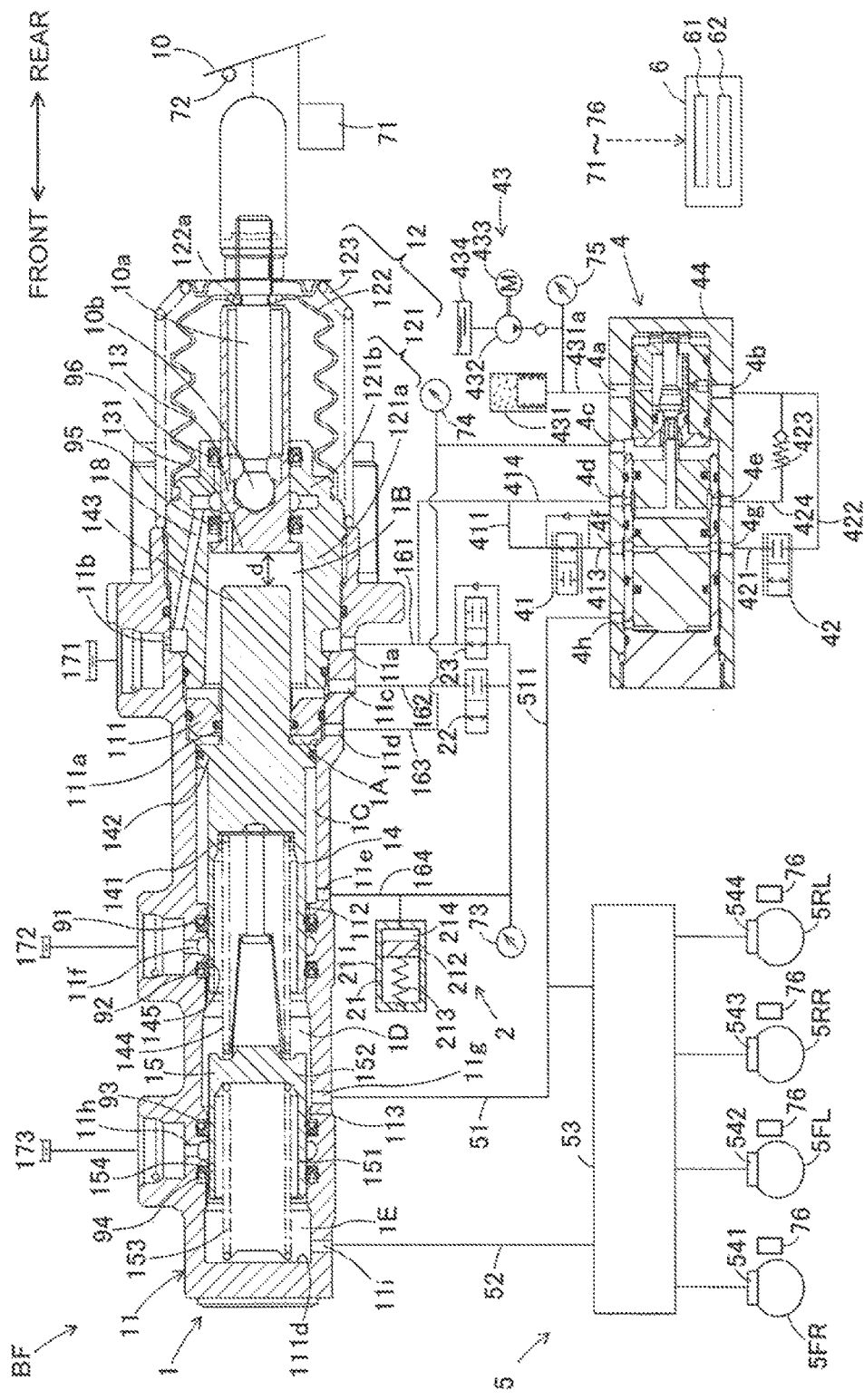
FIG. 1 is a conceptual view of the structure of the vehicle brake device according to a first embodiment of the invention.

The brake device according to the embodiments of the invention will be explained hereinafter with reference to the attached drawings. It is noted that the shape and the size of each component in the drawings, by which the structural explanation thereof will be made, are not necessarily accurate to the actual product.

First Embodiment

As shown in FIG. 1, the brake device is formed by a hydraulic pressure braking force generating device BF which generates the hydraulic pressure braking force and applies the hydraulic pressure braking force to vehicle wheels 5FR, 5FL, 5RR and 5RL and a brake ECU 6 which controls the hydraulic pressure braking force generating device BF.

(Hydraulic Pressure Braking Force Generating Device BF)

The hydraulic pressure braking force generating device BF is formed by a master cylinder 1, a reaction force generating device 2, a first control valve 22, a second control valve 23, a servo pressure generating device 4, a hydraulic pressure control portion 5 and various sensors 71 through 76 and so on.

(Master Cylinder 1)

The master cylinder 1 is a portion which supplies the operating fluid to the hydraulic pressure control portion 5 in response to the operating amount of a brake pedal 10 and is formed by a main cylinder 11, a cover cylinder 12, an input piston 13, a first master piston 14 and a second master piston 15 and so on. The brake pedal 10 may be of any type of brake operating means that can perform braking operation by a driver of the vehicle. The number of the pistons may be one.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. A through hole 111a penetrating in front and rearward directions is provided at a central portion of the inner wall portion 111. The main cylinder 11 is provided therein at portions closer to the front end than the inner all portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b of the cylindrical portion 121 is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. When the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. The first master piston 14 is biased in a rear direction by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the inner wall portion 111 and the outer peripheral surface of the first master piston 14. The front end portion and the rear end portion of the flange portion 142 of the first master piston 14 separate the rear chamber into a front portion and a rear portion and a "second hydraulic pressure chamber 1C" is defined at the front side and a "servo chamber (corresponding to the output chamber) 1A" is defined at the rear side. Further, a "first hydraulic pressure chamber 13" is defined by the inner peripheral portion of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface of the main cylinder 11, the inner bottom surface 111d and the second master piston 15.

Ports 11a through 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

A sealing member, such as an O-ring and the like (see black dot in the drawings) is appropriately provided within the master cylinder 1. The sealing members 91 and 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95 and 96 are provided between the input piston 13 and the cylindrical portion 121.

The stroke sensor 71 is a sensor which detects the operating amount (stroke amount) of the operation of the brake pedal 10 by a driver of the vehicle and transmits the detected result to the brake ECU 6. A brake stop switch 72 is a switch which detects whether the brake pedal 10 is depressed or not, using a binary signal and a detected signal is sent to the brake ECU 6.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location forward side of the piston 212. The piston 212 is biased in the forward side direction by a compression spring 213. The reaction force hydraulic pressure chamber 214 is connected to the second hydraulic pressure chamber 10 via a conduit 164 and the port 11e, and is connected further to the first control valve 22 and the second control valve 23 via the conduit 164.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 10 via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 10.

The first control valve 22 is closed under non-energized state where an electricity is not applied and under this state, communication between the first hydraulic pressure chamber 1B and the second hydraulic pressure chamber 10 is interrupted. Due to the closure of the first hydraulic pressure chamber 1B, the operating fluid is nowhere to flow and the input piston 13 and the first master piston 14 are moved integrally keeping a constant separation distance "d" therebetween. The first control valve 22 is open under the energized state where an electricity is applied and under such state, the communication between the first hydraulic pressure chamber 1B and the second hydraulic pressure chamber 1C is established. Thus, the volume changes in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 10 and the first hydraulic pressure chamber 1B and is connected to the conduit 164. The pressure sensor 73 detects the pressure of the second hydraulic pressure chamber 1C while the first control valve 22 is in a closed state and also detects the pressure of the first hydraulic pressure chamber 1B while the first control valve 22 is in an open state. The pressure sensor 73 sends the detected signal to the brake ECU 6.

(Second Control Valve 23)

The second control valve 23 is an electromagnetic valve which is structured to open under a non-energized state and the opening and closing thereof is controlled by the brake ECU 6. The second control valve 23 is disposed between the conduit 164 and the conduit 161 for establishing communication therebetween. The conduit 164 is in communication with the second hydraulic pressure chamber 10 via the port 11e and the conduit 161 is in communication with the reservoir 171 via the port 11a. Accordingly, the second control valve 23 establishes communication between the second hydraulic pressure chamber 10 and the reservoir 171 under the non-energized state not to generate any reaction force hydraulic pressure but interrupts the communication therebetween to generate the reaction force hydraulic pressure under the energized state.

(Servo Pressure Generating Device 4)

The servo pressure generating device 4 is formed by a pressure decreasing valve 41 (corresponding to a pressure decreasing electromagnetic valve), a pressure increasing valve 42 (corresponding to a pressure increasing electromagnetic valve), a pressure supplying portion 43 and a regulator 44 and an on. The pressure decreasing valve 41 is a valve structured to open under a non-energized state and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 (corresponding to a low pressure source) via the conduits 411, 161 and ports 11a and 11b. It is noted here that the conduit 411 may not be connected to the reservoir 171, but may be connected to a reservoir 434, which will be explained later. In such case, the reservoir 434 corresponds to the low pressure source. Further, a common reservoir may be used for both of the reservoir 171 and the reservoir 434.

The pressure increasing valve 42 is a valve structured to close under a non-energized state and the flow-rate thereof is controlled by the brake ECU 6. One end of the pressure increasing valve 42 is connected to the conduit 421 and the other end thereof is connected to the conduit 422. The pressure decreasing valve 41 and the pressure increasing valve 42 correspond to the pilot hydraulic pressure generating device. The pressure decreasing valve 41 and the pressure increasing valve 42 indicate the pressure differential type electromagnetic valve which valve opening electric current is determined by the difference in pressure between the one side (inlet) and the other side (outlet) thereof.

The pressure supplying portion 43 is a portion for supplying the regulator 44 mainly with a highly pressurized operating fluid. The pressure supplying portion 43 includes an accumulator 431 (corresponding to the high pressure source), a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431*a*. The hydraulic pressure pump 432 is driven by the motor 433 and supplies the operating fluid which is reserved in the reservoir 434 to the accumulator 431. The pressure sensor 75 provided in the conduit 431*a* detects the accumulator hydraulic pressure in the accumulator 431 and the detected signal is sent to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the operating fluid to the accumulator 431 in order to recover a pressure up to the value equal to or more than the predetermined value.

Figure 2:
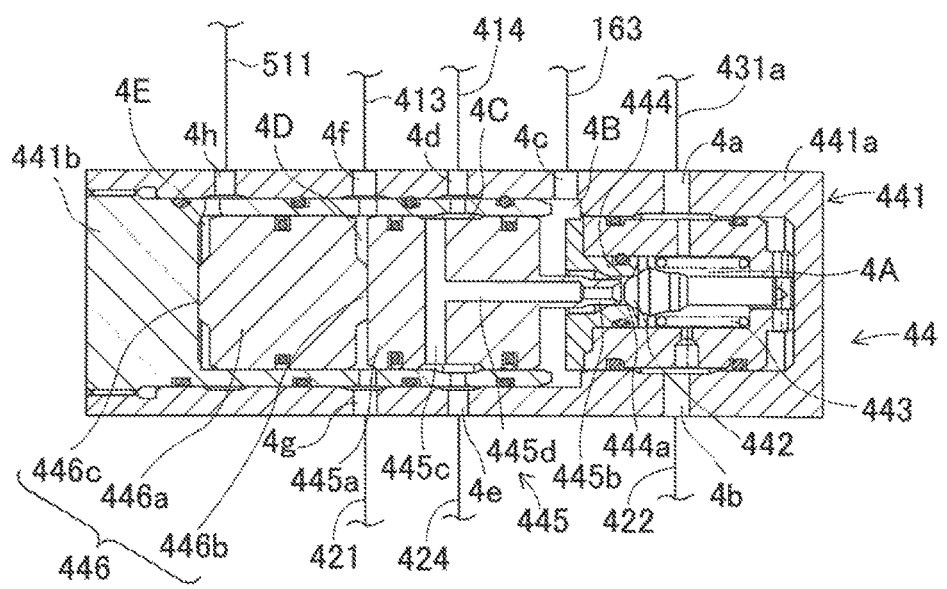
FIG. 2 is a cross sectional view of a detail structure of the regulator according to the first embodiment.

The regulator 44 (corresponding to the pressure adjusting device) includes a cylinder 441, a ball valve 442, a biasing portion 443, a valve seat portion 444, a control piston 445 (corresponding to a "piston") and a sub-piston 446 and so forth as shown in FIG. 2.

The cylinder 441 includes a cylinder case 441*a* formed in a substantially bottomed cylinder-shape having a bottom surface at one end thereof (at the right side in the drawing) and a cover member 441*b* closing an opening of the cylinder case 441*a* (at the left side thereof in the drawing). It is noted here that the cylinder case 441*a* is provided with a plurality of ports 4*a* through 4*h* through which the inside and the outside of the cylinder case 441*a* are in communication. The cover member 441*b* is formed in a substantially bottomed cylinder-shape having a bottom surface. A plurality of ports which is arranged opposite to the respective ports 4*a* through 4*h*, are provided at a cylindrical portion of the cover member 441*b*.

The port 4*a* is connected to the conduit 431*a*. The port 4*b* is connected to the conduit 422. The port 4*c* is connected to a conduit 163. The conduit 163 connects the servo chamber 1A and the outlet port 4*c*. The port 4*d* is connected to the conduit 161 via the conduit 414. The port 4*e* is connected to the conduit 424 and further connected to the conduit 422 via a relief valve 423. The port 4*f* is connected to the conduit 413. The port 4*g* is connected to the conduit 421. The port 4*h* is connected to a conduit 511, which is branched from the conduit 51. It is noted here that the conduit 414 may not be connected to the conduit 161, but may be connected to the reservoir 434.

The ball valve 442 is a valve having a ball shape and is arranged at the bottom surface side (which will be hereinafter referred to also as a cylinder bottom surface side) of the cylinder case 441*a* inside of the cylinder 441. The biasing portion 443 is formed by a spring member biasing the ball valve 442 towards the opening side (which will be hereinafter referred to also as a cylinder opening side) of the cylinder case 441*a*, and is provided at the bottom surface of the cylinder case 441*a*. The valve seat portion 444 is a wall member provided at the inner peripheral surface of the cylinder case 441*a* and divides the cylinder into the cylinder opening side and the cylinder bottom surface side. A through passage 444*a* through which the divided cylinder opening side and the cylinder bottom surface side are in communication is formed at a center of the valve seat portion 444. The valve member 444 supports the ball valve 442 from the cylinder opening side in a manner that the biased ball valve 442 closes the through passage 444*a*. A valve seat surface 444*b* is formed at the opening of the cylinder bottom surface side of the through passage 444*a* and the ball valve 442 is detachably seated (in contact) on the valve seat surface 444*b*.

A space defined by the ball valve 442, the biasing portion 443, the valve seat portion 444 and the inner circumferential surface of the cylinder case 441*a* at the cylinder bottom surface side is referred to as a "first chamber 4A". The first chamber 4A is filled with the operating fluid and is connected to the conduit 431*a* via the port 4*a* and to the conduit 422 via the port 4*b*.

The control piston 445 includes a main body portion 445*a* formed in a substantially columnar shape and a projection portion 445*b* formed in a substantially columnar shape having a smaller diameter than the main body portion 445*a*. The main body portion 445*a* is arranged in the cylinder 441 in a coaxial and liquid-tight manner on the cylinder opening side of the valve seat portion 444, the main body portion 445*a* being slidably movable in the axial direction. The main body portion 445*a* is biased towards the cylinder opening side by means of a biasing member (not shown). A passage 445*c* is formed at a substantially intermediate portion of the main body portion 445*a* in a cylinder axis direction. The passage 445*c* extends in the radial direction (in an up-and-down direction as viewed in the drawing) and both end portions thereof open at a circumferential surface of the main body portion 445*a*. A portion of an inner circumferential surface of the cylinder 441 corresponding to an opening position of the passage 445*c* is provided with the port 4*d* and is formed to be recessed, which recessed space portion forms a "third chamber 4C".

The projection portion 445*b* projects towards the cylinder bottom surface side from a center portion of an end surface of the cylinder bottom surface side of the main body portion 445*a*. The projection portion 445*b* is formed so that the diameter thereof is smaller than the diameter of the through passage 444*a* of the valve seat portion 444. The projection portion 445*b* is coaxially provided relative to the through passage 444*a*. A tip end of the projection portion 445*b* is spaced apart from the ball valve 442 towards the cylinder opening side by a predetermined distance. A passage 445*d* is formed at the projection portion 445*b* an that the passage 445*d* extends in the cylinder axis direction and opens at a center portion of an end surface of the projection portion 445*b*. The passage 445*d* extends up to the inside of the main body portion 445*a* and is connected to the passage 445*c*.

A space defined by the end surface of the cylinder bottom surface side of the main body portion 445*a*, an outer surface of the projection portion 445*b*, the inner circumferential surface of the cylinder 441, the valve seat portion 444 and the ball valve 442 is referred to as a "second chamber 4B". The second chamber 4B is in communication with the ports 4*d* and 4*e* via the passages 445*d* and 445*c* and the third chamber 4C in a state where the projection portion 445*b* and the ball valve 442 are not in contact.

The sub-piston 446 includes a sub main body portion 446*a*, a first projection portion 446*b* and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a, the sub main body portion 446a being slidably movable in the axial direction.

The first projection portion 446b is formed in a substantially columnar shape having a smaller diameter than the sub main body portion 446a and projects from a center portion of an end surface of the cylinder bottom surface side of the sub main body portion 446a. The first projection portion 446b is in contact with the end surface of the cylinder bottom surface side of the main body portion 445a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D" (which corresponds to the "pilot chamber"). The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 (corresponding to the "output pressure obtaining means") is a sensor that detects the servo pressure (corresponding to the "output hydraulic pressure") to be supplied to the servo chamber 1A and is connected to the conduit 163. The pressure sensor 74 sends the detected signal to the brake ECU 6.

As explained, the regulator 44 configured to include the control piston 445 which is driven by a force generated by a difference between the force corresponding to the pressure in the first pilot chamber 4D (referred to also as "pilot pressure") and the force corresponding to the servo pressure, and the volume of the first pilot chamber 4D varies in response to the movement of the control piston 445, a reference position of the control piston 445 being a position under a state that the force corresponding to the pilot pressure and the force corresponding to the servo pressure are balanced and when the flow rate of the liquid flowing into or out of the first pilot chamber 4D increases, the movement of the control piston 445 from the reference position increases to thereby increase the flow rate of the liquid flowing into or out of the servo chamber 1A.

The regulator 44 is structured so that the more the flowing amount of the liquid flowing into the first pilot chamber 4D from the accumulator 431 increases, the larger the volume of the first pilot chamber 4D becomes and at the same time the more the flowing amount of the liquid flowing into the servo chamber 1A from the accumulator 431 increases and further, the more the flowing amount of the liquid flowing out from the first pilot chamber 4D into the reservoir 171 increases, the smaller the volume of the first pilot chamber 4D becomes and at the same time the more the flowing amount of the liquid flowing out of the servo chamber 1A into the reservoir 171 increases.

Further, the control piston 445 is provided with a damper device Z at the wall portion facing to the first pilot chamber 4D. The damper device Z is structured as a stroke simulator and is provided with a piston portion which is biased towards the first pilot chamber 4D by a biasing member. By this provision of the damper device Z, the rigidity of the first pilot chamber 4D is variable in response to the pilot pressure.

(Hydraulic Pressure Control Portion 5)

The first master chamber 1D and the second master chamber 1E which generate the master cylinder hydraulic pressure (master pressure) are connected to the wheel cylinders 541 through 544 via the conduits 51 and 52 and ABS 53 (Anti-lock Brake System). The wheel cylinders 541 through 544 form a brake device for the vehicle wheels 5FR through 5RL. In more specifically, the port 11g of the first master chamber 1D and the port 11i of the second master chamber 1E are connected to the well-known ABS 53 via the conduits 51 and 52, respectively. The ABS 53 is connected to the wheel cylinders 541 through 544 which are operated to perform braking operation at the wheels 5FR through 5RL.

The ABS 53 includes a wheel speed sensor 76 which is equipped at each vehicle wheel to detect the wheel speed at the corresponding wheel. The detected signal which indicates the wheel speed detected by the wheel speed sensor 76 is outputted to the brake ECU 6.

In the ABS 53 structured above, the brake ECU 6 executes an ABS control (Anti-lock braking control) by controlling the switching over of each holding valve and the pressure decreasing valve based on the master pressure (presumed by the servo pressure detected by the pressure sensor 74), state of wheel speed and front/rear acceleration and adjusting the brake hydraulic pressure to be applied to each wheel cylinder 541 through 544, i.e., braking force to be applied to each wheel 5FR through 5RL by operating the motor when necessary. The ABS 53 is a device which supplies the operating fluid supplied from the master cylinder 1 to the wheel cylinders 541 through 544 by adjusting the amount and the timing based on the instructions from the brake ECU 6.

Under the "brake control" which will be explained later, when the hydraulic pressure sent from the accumulator 431 of the servo pressure generating device 4 is controlled by the pressure increasing valve 42 and the pressure decreasing valve 41, the servo pressure is generated in the servo chamber 1A. Then the first master piston 14 and the second master piston 15 advance to pressurize fluid in the first master chamber 1D and the second master chamber 1E. The pressurized hydraulic pressures in the first master chamber 1D and the second master chamber 1E are supplied to the wheel cylinders 541 through 544 via the conduits 51 and 52 and the ABS 53 as the master pressure thereby applying hydraulic pressure braking force to the wheels 5FR through 5RL.

(Brake ECU 6)

The brake ECU 6 is an electronic control unit and includes a microprocessor. The microprocessor includes an input/output interface, CPU. RAM, ROM and a memory portion such as non-volatile memory, connected with one another through bus communication.

The brake ECU 6 is connected to the various sensors 71 through 76 for controlling the electromagnetic valves 22, 23, 41 and 42 and the motor 433 and so on. The operating amount (stroke amount) of brake pedal 10 operated by the operator of the vehicle is inputted to the brake ECU 6 from the stroke sensor 71, whether or not the operation of the brake pedal 10 by the operator of the vehicle is performed is inputted to the brake ECU 6 from the brake stop switch 72, the reaction force hydraulic pressure of the second hydraulic pressure chamber 1C or the pressure (or the reaction force hydraulic pressure) of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR through 5RL is inputted to the brake ECU 6 from each of the wheel speed sensors 76.

(Brake Control)

The brake control operation of the brake ECU 6 will be explained hereinafter. The brake control means a normally operated brake control. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 10 and the reservoir 171 is interrupted and by the opening of the first control valve 22, the communication between the first hydraulic pressure chamber 1B and the second hydraulic pressure chamber 10 is established. Thus, the brake control is a mode for controlling the servo pressure of the servo chamber 1A by controlling the pressure decreasing and pressure increasing valves 41 and 42 under the first control valve 22 being opened and the second control valve 23 being closed. The pressure decreasing valve 41 and the pressure increasing valve 42 may be said to be a valve device which adjusts the flowing amount of the operating fluid which flows into or out of the first pilot chamber 4D. Under this brake control, the brake ECU 6 calculates the "required braking force" of the driver of the vehicle based on the operating amount of the brake pedal 10 detected by the stroke sensor 72 (displaced amount of the input piston 13) or the operating force of the brake pedal 10.

In more detail, under the state that the brake pedal 10 is not depressed, the brake control becomes the state as explained above, i.e., the state that the ball valve 442 closes the through passage 444a of the valve seat portion 444. Under this state, the pressure decreasing valve 41 is in an open state and the pressure increasing valve 42 is in a closed state. In other words, the communication between the first chamber 4A and the second chamber 4B is interrupted.

The second chamber 4B is in communication with the servo chamber 1A via the conduit 16 to keep the hydraulic pressures in the two chambers 4B and 1A being mutually in an equal level. The second chamber 4B is in communication with the third chamber 4C via the passages 445c and 445d of the control piston 445. Accordingly, the second chamber 4B and the third chamber 40 are in communication with the reservoir 171 via the conduits 414 and 161. One side of the pilot hydraulic pressure chamber 4D is closed by the pressure increasing valve 42, while the other side thereof is connected to the reservoir 171 via the pressure decreasing valve 41. The pressures of the first pilot chamber 4D and the second chamber 4B are kept to the same pressure level. The second pilot chamber 4E is in communication with the first master chamber 1D via the conduits 511 and 51 thereby keeping the pressure level of the two chambers 4E and 1D mutually to be equal to each other.

From this state, when the brake pedal 10 is depressed, the brake ECU 6 controls the pressure decreasing valve 41 and the pressure increasing valve 42 based on the target friction braking force. In other words, the brake ECU 6 controls the pressure decreasing valve 41 to close and controls the pressure increasing valve 42 to open.

When the pressure increasing valve 42 is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized operating fluid supplied from the accumulator 431. By this raising of the pressure in the first pilot chamber 4D, the control piston 445 slidably moves towards the cylinder bottom surface side. Then the tip end of the projecting portion 445 of the control piston 445 is brought into contact with the ball valve 442 to close the passage 445d by the ball valve 442. Thus the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized operating fluid is supplied to the first chamber 4A from the accumulator 431, the hydraulic pressure in the second chamber 4B is also increased by the communication therebetween. It is noted that the more the separated distance of the ball valve 442 from the valve seat surface 444b becomes large, the more the fluid passage for the operating fluid becomes large and accordingly, the hydraulic pressure in the fluid passage downstream of the ball valve 442 becomes high. In other words, the more the pressure in the first pilot chamber 4D (pilot pressure), the larger the moving distance of the control piston 445 becomes and the larger the separated distance of the ball valve 442 from the valve seat surface 444b becomes and accordingly, the hydraulic pressure in the second chamber 4B (servo pressure) becomes high. The brake ECU 6 controls the pressure increasing valve 42 so that the fluid passage at the downstream side of the pressure increasing valve 42 becomes large and at the same time controls the pressure decreasing valve 41 so that the fluid passage at the downstream side of the pressure decreasing valve 41 becomes small, in such a manner that the more the displacement amount of the input piston 13 (operating amount of the brake pedal 10) detected by the stroke sensor 72, the higher the pilot pressure in the first pilot chamber 4D becomes. In other words, the more the displacement amount of the input piston 13 (operating amount of the brake pedal 10), the higher the pilot pressure becomes and the higher the servo pressure becomes.

As the pressure increase of the second chamber 4B, the pressure in the servo chamber 1A which is in fluid communication with the second chamber 4B increases. By the pressure increase in the servo chamber 1A, the first master piston 14 advances forward and the pressure in the first master chamber 1D increases. Then the second master piston 15 advances forward also and the pressure in the second master chamber 1E increases. By the increase of the pressure in the first master chamber 1D, highly pressurized operating fluid is supplied to the ABS 53 which will be explained later and the second pilot chamber 4E. The pressure in the second pilot chamber 4E increases, but since the pressure in the first pilot chamber 4D is also increased, the sub piston 446 does not move. Thus, the highly pressurized (master pressure) operating fluid is supplied to the ABS 53 and friction brake is operated to control braking operation of the vehicle. The force advancing the first master piston 14 under the brake control corresponds to the force corresponding to the servo pressure.

When the braking operation is released, as opposite to the above, the pressure decreasing valve 41 is open and the pressure increasing valve 42 is closed to establish the communication between the reservoir 171 and the first pilot chamber 4D. Then the control piston 445 retreats and the vehicle return to the state before depression of the brake pedal 10.

(Pressure Increasing Gradient Limiting Control & Pressure Decreasing Gradient Limiting Control)

Here, the pressure increasing gradient limiting control which limits the pressure increasing gradient under the pressure increasing control and the pressure decreasing gradient limiting control which limits the pressure decreasing gradient under the pressure decreasing control (hereinafter, referred to generally as "gradient limiting control") for the purpose of suppressing the overshooting or the undershooting of the servo pressure will be explained. The brake ECU 6 includes as a function, a control means 61 which executes the brake control by controlling the pressure decreasing valve 41 and the pressure increasing valve 42 and a limiting necessity judging means 62.

The limiting necessity judging means 62 judges whether the gradient of the servo pressure (change amount per unit time) (pressure gradient) should be limited or not based on the target servo pressure (corresponding to the target output pressure) and the actual servo pressure correlation value (corresponding to the actual output correlation value) in order to suppress the overshooting or the undershooting of the servo pressure. The target servo pressure is a target pressure of the servo pressure set in response to the operating amount of the brake pedal 10 (or in response to the required braking force). The brake ECU 6 (control means 61) determines the target servo pressure in response to the operating amount referring to the memorized map. In this embodiment, the actual servo pressure correlation value is a value of the actual servo pressure (corresponding to the actual output pressure) measured by the pressure sensor 74.

The limiting necessity judging means 62 specifically judges whether or not the difference in pressure (deviation) between the target servo pressure and the actual servo pressure is less than a predetermined threshold value. The limiting necessity judging means 62 memorizes the first threshold value as the threshold value at the pressure increasing and memorizes the second threshold value as the threshold value at the pressure decreasing. The limiting necessity judging means 62 judges that "the gradient of the servo pressure should be limited", when the difference in pressure between the target servo pressure and the actual servo pressure at the pressure increasing is less than the first threshold value and judges that "the gradient of the servo pressure should be limited", when the difference in pressure between the target servo pressure and the actual servo pressure at the pressure decreasing is less than the second threshold value. In other words, the limiting necessity judging means 62 make a judgment whether the gradient of the servo pressure should be limited (should be lessened) or not based on the difference in pressure between the target servo pressure and the actual servo pressure. According to this embodiment, the first threshold value and the second threshold value are set to be the same value. The limiting necessity judging means 62 judges whether the gradient of the servo pressure should be limited or not in order to suppress the over hooting or the undershooting.

The control means 61 opens the pressure decreasing valve 41 when the limiting necessity judging means 62 judges that the gradient of the servo pressure should be limited, under the brake control operation. In other words, the control means 61 makes the control current to be applied to the pressure decreasing valve 41 to be less than the valve opening electric current for opening the pressure decreasing valve 41. Thus, the pressure decreasing valve 41 is changed from the closed state to the open state. Then the operating fluid (brake fluid) flows into the first pilot chamber 4D via the pressure increasing valve 42 and flows out of the first pilot chamber 4D via the pressure decreasing valve 41. Accordingly the pressure increasing gradient of the pilot pressure becomes small and as a result, the pressure increasing gradient of the servo pressure also becomes small. When the difference in pressure between the target servo pressure and the actual servo pressure is less than the first threshold value, i.e., when the actual servo pressure is close to the target servo pressure, the gradient of the servo pressure becomes small and thereby the hysteresis amount becomes small to suppress the overshooting.

The control means 61 sets the opening degree (control current) of the pressure decreasing valve 41 based on the difference in pressure between the target servo pressure and the actual servo pressure at the judgement by the limiting necessity judging means 62 (here, the first threshold value) by referring to the map or the like. In other words, the control means 61 further increases the decreasing rate of the pressure increasing gradient by widening the opening degree of the pressure decreasing valve 41 when the difference in pressure is small and decreases the decreasing rate of the pressure increasing gradient by narrowing the opening degree of the pressure decreasing valve 41 when the difference in pressure is big. According to this embodiment, since the limiting necessity judging means judges that "the gradient should be limited" when the difference in pressure becomes less than the first threshold value, opening degree of the pressure decreasing valve 41 is controlled in response to the first threshold value. However, this may be changed to the setting such that after the judgment of "the gradient should be limited", the control means 61 calculates the difference in pressure between the target servo pressure and the actual servo pressure every fixed time period and the opening degree of the pressure decreasing valve 41 can be changed in response to the calculated difference. Further, the control means 61 sets the valve opening time of the pressure decreasing valve 41 based on the difference in pressure between the target servo pressure and the actual servo pressure (here, the first threshold value). The valve opening time is set such that the larger the difference in pressure, the shorter the opening time becomes and smaller the difference, the longer the opening time becomes. The valve opening time may be changed every predetermined time period. The control means 61 opens the pressure decreasing valve 41 only for the valve opening time, but when the actual servo pressure enters into the dead zone during the valve opening time, the pressure decreasing valve 41 is changed to the holding control (closing the valve) at the time of entering into the dead zone.

The hysteresis amount means the change amount of the servo pressure which changes even the pressure increasing control or the pressure decreasing control of the servo pressure has been completed (switched over to the holding control). The holding control is the control for the pressure decreasing valve 41 and the pressure increasing valve 42 to be in a closed state. The hysteresis is generated due to a pressure increasing continuing state continuing for a time when the control piston 445 retreats from the pressure increasing position to the position to interrupt the fluid communication between the first chamber 4A and the second chamber 4B upon the change of the control state, for example, from the pressure increasing control state in which the control piston 445 pushes the ball valve 442 to establish the communication between the first chamber 4A and the second chamber 4B (the state that the control piston 445 is located at the pressure increasing position) to the holding control state in which the first pilot chamber 4D is in a liquid-tight state by closing the pressure decreasing valve 41 and the pressure increasing valve 42. The larger the gradient of the servo pressure, i.e., the gradient of the pilot pressure, the more the state of the control piston become in advanced state and the longer the retreating time of the piston after the change to the holding control state, and thus the amount of hysteresis become large. Oppositely, the smaller the gradient of the servo pressure, the smaller the amount of the hysteresis.

A dead zone is set for the target servo pressure by the control means 61. The dead zone is set for two sides, which are minus and plus sides, relative to the target servo pressure. The control means 61 changes the brake control to the holding control when the actual servo pressure becomes a value within the dead zone range, upon brake control operation. In other words, the control means 61 recognizes that the actual servo pressure substantially reaches the target servo pressure when the actual servo pressure becomes a value within the dead zone range (dead zone area) in performing the brake control. By setting the dead zone, the hunting of the hydraulic pressure control can be more suppressed than the case where the target servo pressure is set to one point.

Figure 3:
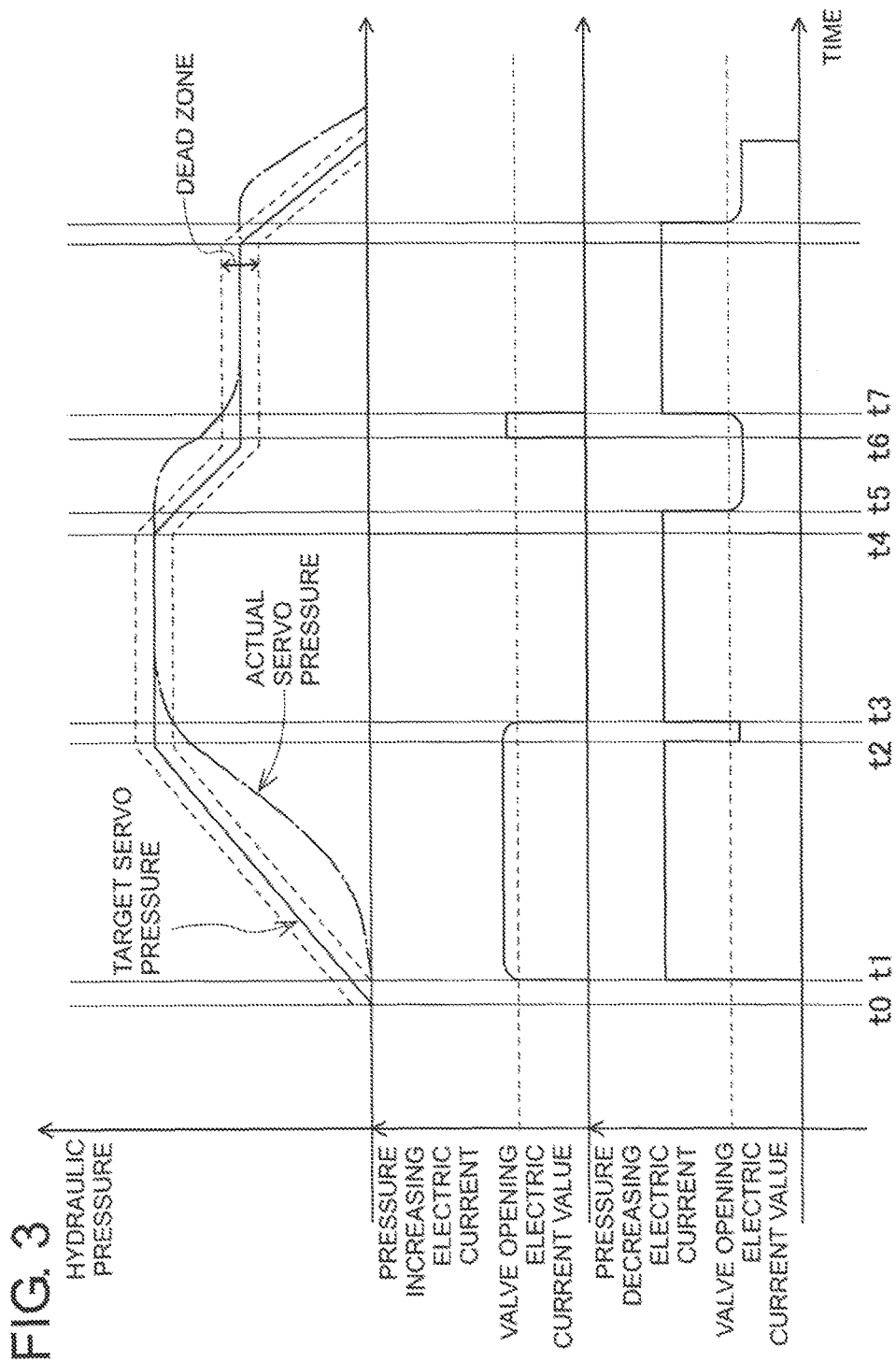
FIG. 3 is a time chart for explaining a gradient limiting control according to the first embodiment.

The gradient limiting control according to the first embodiment will be explained hereinafter raising an example thereof. As shown in FIG. 3, at the time t0, the brake pedal 10 is operated and the increase of the target servo pressure starts. At the time t1, the actual servo pressure is positioned out of the dead zone and the brake control (feedback control: FB control) based on the difference in pressure between the target servo pressure and the actual servo pressure begins to start. In other words, at the time t1, the control current which is larger than the valve opening electric current of the pressure increasing valve 42 is applied on the pressure increasing valve 42 to open the pressure increasing valve 42 and the control current which is larger than the valve opening electric current of the pressure decreasing valve 41 is applied on the pressure decreasing valve 41 to close the pressure decreasing valve 41. During the time between the time t1 and the time t2, the servo pressure increases with the pressure increasing gradient based on the feedback control. At a certain time before reaching to the time t2, the target servo pressure becomes constant in response to the brake operation.

At the time t2, the difference in pressure between the target servo pressure and the actual servo pressure becomes less than the first threshold value and the limiting necessity judging means 62 judges that the gradient should be limited and the pressure decreasing valve 41 opens. In other words, at the time t2, the control electric current which is smaller than the valve opening electric current is applied on the pressure decreasing valve 41 to open the pressure decreasing valve 41. At the time t2, the opening degree of the pressure increasing valve 42 is controlled by the control means 61 so that the servo pressure becomes a predetermined gradient (0<predetermined gradient<gradient at the time t2). Here, the control electric current to be applied on the pressure increasing valve 42 is gradually decreased. At the time t3, the actual servo pressure enters into the dead zone and the control mode is changed to the holding control mode. In other words, at the time t3, the control electric current which is less than the valve opening electric current (in this example, zero) is applied on the pressure increasing valve 42 to close the pressure increasing valve 42 and the control electric current which is larger than the valve opening electric current is applied on the pressure decreasing valve 41 to close the pressure decreasing valve 41. After the time t3, hysteresis is generated in response to the increase gradient of the servo pressure at the time t3, and the actual servo pressure approximates the target servo pressure.

After the hysteresis is generated, the servo pressure is held to be constant and the target servo pressure decreases in response to the brake operation at the time t4. During the time t4 through the time t5, the actual servo pressure is positioned within the dead zone and the holding control continues. At the time t5, the actual servo pressure goes out of the dead zone and the pressure decreasing valve 41 is opened by the feedback control. In other words, at the time t5, the control electric current which is less than the valve opening electric current for the pressure decreasing valve 41 is applied on the pressure decreasing valve 41 to open thereof. At the time t6, the difference in pressure between the target servo pressure and the actual servo pressure becomes less than the second threshold value and the limiting necessity judging means 62 judges that the gradient should be limited. Then the pressure increasing valve 42 opens. In other words, at the time t6, the control electric current which is larger than the valve opening electric current for the pressure increasing valve 42 is applied thereon.

From the time t6 to the time t7, the control electric current for the pressure decreasing valve 41 becomes gradually large so that the opening degree of the pressure decreasing valve 41 is controlled such that the servo pressure becomes the predetermined gradient (gradient at the time t6<predetermined gradient<0). At the time t7, the actual servo pressure enters into the dead zone and the control mode is changed to the holding control mode. After the time t7, the hysteresis is generated and the actual servo pressure approximates the target servo pressure. Thereafter, a control similar to the above control is performed.

According to the first embodiment, when the actual servo pressure approximates the target servo pressure, if the control mode is the pressure increasing control, the pressure decreasing valve 41 is opened and if the control mode is the pressure decreasing control, the pressure increasing valve 42 is opened. This can minimize the gradient of the servo pressure and thus the generated hysteresis is reduced to suppress the overshooting or the undershooting.

Figure 4:
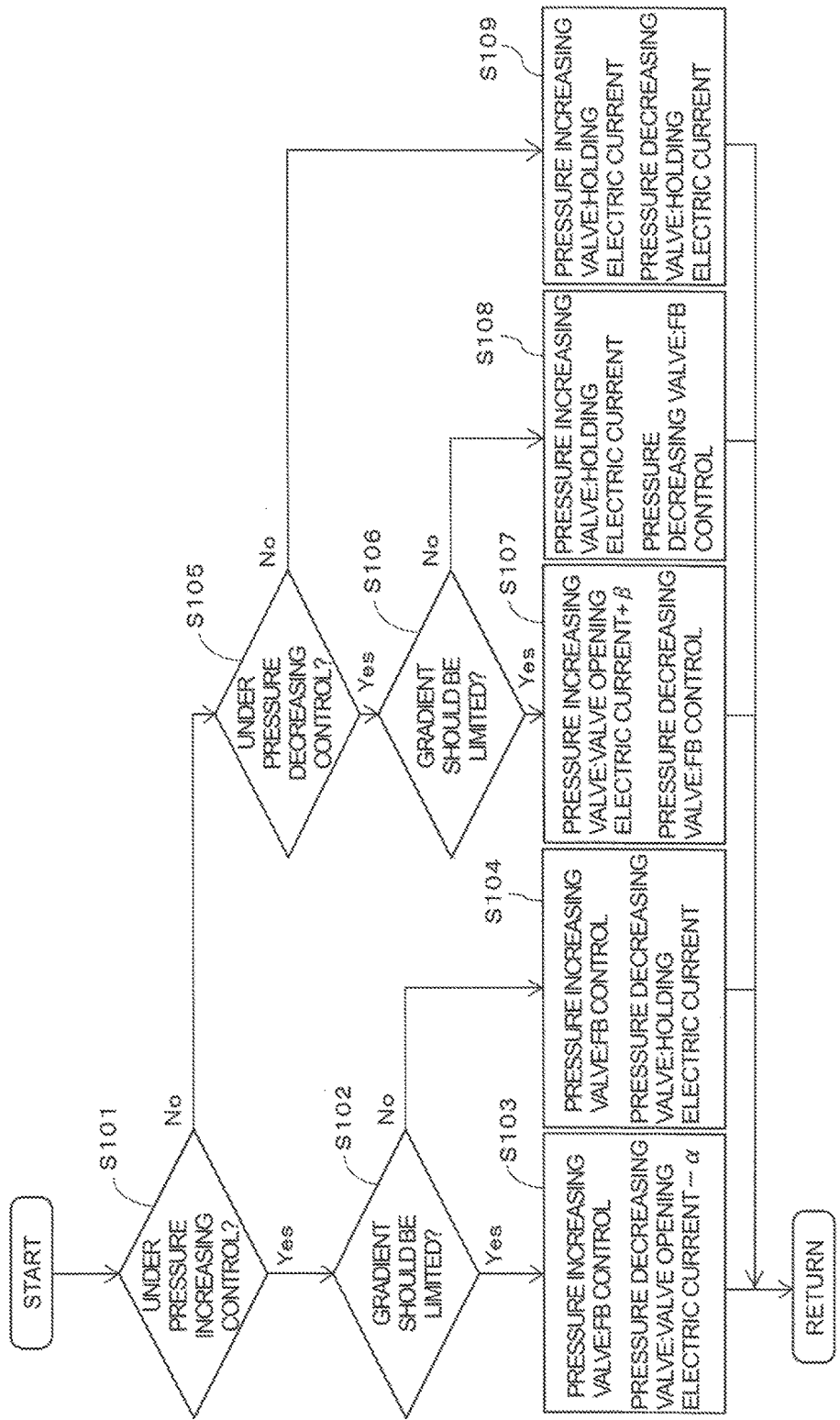
FIG. 4 is a flowchart for explaining a gradient limiting control according to the first embodiment.

The flow of the gradient limiting control according to the first embodiment will be explained hereinafter. As shown in FIG. 4, when the pressure increasing control is being performed (S101; Yes), it is judged whether the gradient of the servo pressure (pressure increasing gradient) should be limited or not (S102). If it is judged that the gradient of the servo pressure should be limited (S102; Yes), the value (instruction value) of the control electric current to be applied on the pressure increasing valve 42 becomes the total of the valve opening electric current and the feedback electric current (hereinafter referred to as "FB electric current") and the value of the control electric current to be applied on the pressure decreasing valve 41 becomes the value obtained by subtracting a predetermined value from the valve opening electric current (valve opening electric current−α) (S103). The FB electric current is the electric current value determined based on the difference in pressure between the target servo pressure and the actual servo pressure. If it is not judged that the gradient of the servo pressure should be limited (S102; No), the value of the control electric current to be applied on the pressure increasing valve 42 becomes the FB electric current and the value of the control electric current to be applied on the pressure decreasing valve 41 becomes the value of the holding electric current (by which current, the valve is in a closing state) (S104).

When the pressure decreasing control is being performed (S101; No, S105; Yes), it is judged whether the gradient of the servo pressure (pressure decreasing gradient) should be limited or not (S106). If it is judged that the gradient of the servo pressure should be limited (S106; Yes), the value of the control electric current to be applied on the pressure increasing valve 42 becomes the value obtained by adding a predetermined value to the valve opening electric current (valve opening electric current+β) and the value of the control electric current to be applied on the pressure decreasing valve 41 becomes the value of the valve opening electric current+FB electric current (S107). If it is not judged that the gradient of the servo pressure should be limited (S106; No), the value of the control electric current to be applied on the pressure increasing valve 42 becomes the holding electric current and the control electric current to be applied on the pressure decreasing valve 41 becomes the total of the valve opening electric current and the FB electric current (S108). When the holding control is being performed, (S101; No, S105; No), the control electric current to the pressure increasing and the pressure decreasing valves 42 and 41 becomes the holding electric current (S109). The brake ECU 6 executes the gradient limiting control every predetermined time (or always). It is noted that the predetermined value α is set to be equal to the predetermined value β (α=β) according to this embodiment.

According to the first embodiment, under the pressure increasing control, when the actual servo pressure approximates the target servo pressure, the pressure decreasing valve 41 opens to limit the pressure increasing gradient of the servo pressure. Thus, the hysteresis amount can be suppressed to limit the overshooting. Further, according to the first embodiment, since the pressure decreasing valve 41 is opened to reduce the pressure increasing gradient under the pressure increasing control, an overshooting can be suppressed even a large pressure increasing gradient is realized until the actual servo pressure approximates the target servo pressure. Thus, by suppressing the overshooting, the actual servo pressure can quickly approximate the target servo pressure. It is noted here that when the pressure decreasing valve 41 is opened under the pressure increasing control, the pressure increasing valve 42 may be closed. Then, the pressure increasing gradient can be quickly reduced.

Similarly, according to the first embodiment, under the pressure decreasing control, when the actual servo pressure approximates the target servo pressure, the pressure increasing valve 42 opens to limit the pressure decreasing gradient of the servo pressure. Thus, the hysteresis amount can be suppressed to limit the undershooting. Thus, according to the first embodiment, the overshooting and the undershooting of the servo pressure can be suppressed.

Second Embodiment

The vehicle brake device according to the second embodiment is different from the vehicle brake device of the first embodiment in setting of the opening degree of the pressure decreasing valve 41. According to the second embodiment, the opening degree of the pressure decreasing valve 41 is set in response to the "difference in pressure between the target servo pressure and the actual servo pressure" and the "gradient of the servo pressure". Such different points will be explained hereinafter.

The control means 61 sets the opening degree of the pressure decreasing valve 41 considering not only the difference in pressure (threshold value) between the target servo pressure and the actual servo pressure at the judgment of the limiting necessity judging means 62, but also considering the gradient of the servo pressure at the judgment of the limiting necessity judging means 62 (obtained from the pressure sensor 74). In the second embodiment, the control means 61 memorizes a map which outputs the proper opening degree of the pressure decreasing valve 41 when the difference in pressure between the target servo pressure and the actual servo pressure and the gradient of the servo pressure are inputted. The map is made by the experiments and the calculations. In the cases of the large gradient of the servo pressure and the small gradient of the servo pressure, if the difference between the target servo pressure and the actual servo pressure is the same on both cases, the overshooting is more likely to occur in the case where the gradient of the servo pressure is large rather than the case where the gradient is small. The control means 61 uses the map made considering this event and controls the pressure decreasing valve 41 so that the opening degree of the pressure decreasing valve 41 becomes larger in the case where the gradient of the servo pressure is larger even the difference in pressure between the target servo pressure and the actual servo pressure is the same on both of the case where the gradient of the servo pressure is large and where the gradient of the servo pressure is small.

The larger the opening degree of the pressure decreasing valve 41 is, the larger the flow rate of the operating fluid flowing out of the first pilot chamber 4D becomes. This can quickly decrease the gradient of the pilot pressure (gradient of the servo pressure). According to the second embodiment, the overshooting can be more accurately suppressed. It is noted here that the control according to the second embodiment explained above can be applicable to the control of the pressure increasing valve 42 under the pressure decreasing control.

Third Embodiment

The vehicle brake device according to the third embodiment is different from the vehicle brake device of the first embodiment in setting of the opening time of the pressure decreasing valve 41. According to the third embodiment, the opening time of the pressure decreasing valve 41 is set in response to the "difference in pressure between the target servo pressure and the actual servo pressure" and the "gradient of the servo pressure". Such different points will be explained hereinafter.

The control means 61 sets the opening time of the pressure decreasing valve 41 under the pressure increasing control, considering not only the difference in pressure (threshold value) between the target servo pressure and the actual servo pressure at the judgment of the limiting necessity judging means 62, but also considering the gradient of the servo pressure at the judgment of the limiting necessity judging means 62 (obtained from the pressure sensor 74). In the third embodiment, the control means 61 memorizes a map which outputs a proper valve opening time of the pressure decreasing valve 41 when the difference in pressure between the target servo pressure and the actual servo pressure and the gradient of the servo pressure are inputted. The map is prepared based on the experiments and the calculations. In the cases of the large gradient of the servo pressure and the small gradient of the servo pressure, if the difference between the target servo pressure and the actual servo pressure is the same on both cases, the overshooting is more likely to occur in the case where the gradient of the servo pressure is large rather than the case where the gradient is small.

The control means 61 uses the map prepared considering this event and controls the pressure decreasing valve 41 so that the valve opening time of the pressure decreasing valve 41 becomes larger in the case where the gradient of the servo pressure is larger even the difference in pressure between the target servo pressure and the actual servo pressure is the same on both of the case where the gradient of the servo pressure is large and where the gradient of the servo pressure is small. The amount of the operating fluid flowing out of the first pilot chamber 4D is determined by the opening degree and the valve opening time of the pressure decreasing valve 41. Therefore, the gradient of the servo pressure can be further decreased by increasing the amount of the operating fluid flowing out of the first pilot chamber 4D by increasing the valve opening time. According to the third embodiment, the overshooting can be more accurately suppressed. It is noted here that the control according to the third embodiment explained above can be applicable to the control of the pressure increasing valve 42 under the pressure decreasing control.

Fourth Embodiment

The vehicle brake device according to the fourth embodiment is different from the vehicle brake device of the first embodiment in determining method for the valve closing timing of the pressure decreasing valve 41 under the pressure increasing control. Such different points will be explained hereinafter.

The control means 61 monitors the change of the actual servo pressure obtained by the pressure sensor 74 while gradually increasing the opening degree of the pressure decreasing valve 41 when the limiting necessity judging means 62 judges that the gradient of the servo pressure should be limited, and closes the pressure decreasing valve 41 in response to the change of the actual servo pressure. In other words, the control means 61 gradually increases the opening degree of the pressure decreasing valve 41 while monitoring the pressure sensor 74, and then closes the pressure decreasing valve 41 in response to the change of the actual servo pressure.

For example, the control means 61 gradually opens the pressure decreasing valve 41 and when the gradient of the actual servo pressure is detected to be small, controls the pressure decreasing valve 41 in the valve closing side to close the pressure decreasing valve 41. Or alternatively, the control means 61 may be structured to close the pressure decreasing valve 41 when the gradient of the actual servo pressure becomes less than the predetermined gradient. The predetermined gradient may be set based on the difference in pressure between the target servo pressure and the actual servo pressure. According to the fourth embodiment, a sudden decrease of the servo pressure due to an excess opening of the pressure decreasing valve 41 can be suppressed and the valve closing timing of the pressure decreasing valve 41 can be properly controlled by monitoring the change of the actual servo pressure. According to the fourth embodiment, too much dropping of the actual servo pressure relative to the target servo pressure can be suppressed. Further, according to the fourth embodiment, the overshooting can be also accurately suppressed. It is noted here that the control according to the fourth embodiment explained above can be applicable to the control of the pressure increasing valve 42 under the pressure decreasing control.

Fifth Embodiment

The vehicle brake device according to the fifth embodiment is different from the vehicle brake device of the first embodiment in the control electric current to be applied on the pressure decreasing valve 41 or the pressure increasing valve 42. Such different points will be explained hereinafter.

Figure 5:
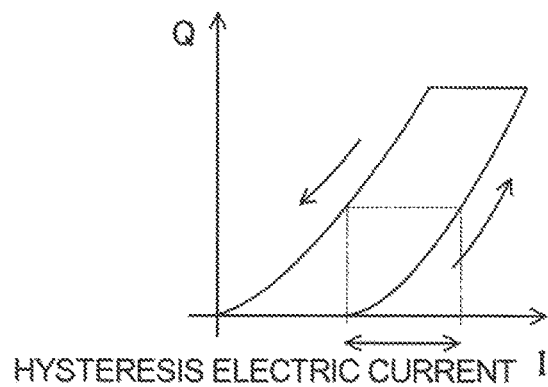
FIG. 5 is an explanatory view for explaining a hysteresis electric current according to a fifth embodiment.

The control means 61 according to the first embodiment applies an electric current value calculated by adding the FB electric current to the valve opening electric current on the pressure increasing valve 42 under the pressure increasing control as a control electric current. To this, the control means 61 according to the fifth embodiment applies an electric current value calculated by subtracting the "hysteresis electric current" from the value calculated by adding the FB electric current to the valve opening electric current on the pressure increasing valve 42 as a control electric current when the limiting necessity judging means 62 judges that "the gradient of the servo pressure should be limited" under the pressure increasing control. The hysteresis electric current is a current value calculated by a hysteresis of an electromagnetic valve (pressure increasing valve 42), as shown in FIG. 5. The hysteresis electric current is calculated based on a hysteresis between the one case where the flow rate is increasing and the other case where the flow rate is decreasing.

Thus, the actual servo pressure approximates the target servo pressure and when the throttling of the pressure increasing valve 42 will be made in near future, such throttling can be made responsively. In other words, by preparing for the future throttling for the pressure increasing valve 42 in advance, the overshooting can be also accurately suppressed. The control where the hysteresis electric current is subtracted from the FB electric current is released when the pressure increasing control is changed to the holding control or the pressure increasing control is re-started. It is noted here that the control according to the fifth embodiment explained above can be applicable to the control of the pressure decreasing valve 41 under the pressure decreasing control.

Sixth Embodiment

The vehicle brake device according to the sixth embodiment is different from the vehicle brake device of the first embodiment in the valve opening control of the pressure decreasing valve 41 under the pressure increasing control which is used for the pressure increasing gradient control together with the pressure increasing valve 42. Such different points will be explained hereinafter.

First, the principle of the control which suppress the overshooting or the undershooting will be explained. By controlling the respective opening degrees of both the pressure decreasing valve 41 and the pressure increasing valve 42, the brake ECU 6 controls the gradient or the flow rate of the pilot pressure and as a result, the gradient of the servo pressure can be controlled. It is noted here that the "target pressure difference" is defined to be the difference in pressure between the actual servo pressure and the target servo pressure. Further, the "regulator pressure difference" is defined to be the difference in pressure in the regulator 44. The regulator pressure difference is a difference in pressure between the pressure of the accumulator 431 (measured value of the pressure sensor 75) and the actual servo pressure (measured value of the pressure sensor 74) when the pressure increasing control is performed and a difference in pressure between the atmospheric pressure (pressure in the reservoir 171) and the actual servo pressure when the pressure decreasing control is performed.

The flow rate is indicated by a formula "$Q=C \times (P)^{1/2}$", wherein Q represents the flow rate (cc/s) of the regulator 44. C represents a coefficient of flow rate and P represents the regulator pressure difference. The coefficient of flow rate C can be obtained by the opening area and the coefficient of fluid viscosity. The flow rate Q of the operating fluid which flows into or out of the servo chamber 1A is obtained based on the pressure gradient of the servo pressure and the rigidity of the servo chamber 1A (MPa/cc). The opening area corresponds to the opening area of the fluid passage which allows the fluid communication between the first chamber 4A and the second chamber 4B when the control piston 445 is separated from the ball valve 442. In other words, from the values of flow rate Q and the regulator pressure difference P, the coefficient of flow rate C relating to the opening area is obtained. The opening area varies in response to the stroke of the control piston 445. Thus, the relationship between the stroke ST of the control piston 445 and the regulator pressure difference P and the flow rate Q ($Q=f(ST, P)$) can be experimentally obtained.

Accordingly, based on the flow rate Q and the regulator pressure difference P, the stroke ST of the control piston 445 can be obtained. Then from the stroke ST and the cross section area of the control piston 445, the varying volume (cc) can be obtained. Based on the varying volume (cc) and the rigidity of the first pilot chamber 4D (MPa/cc), the hydraulic pressure change amount (pressure change amount) of the servo pressure by the flow rare Q can be obtained. In other words, based on the current flow rate Q (current gradient of the servo pressure) and the current regulator pressure difference P, the hydraulic pressure change amount of the servo pressure under the state (hereinafter referred to simply as "hydraulic pressure change amount") can be calculated. The hydraulic pressure change amount corresponds to the change amount where the servo pressure changes by the displacement of the control piston 445 after the flow rate of the operating fluid which flows into or out of the first pilot chamber 4D is set to be zero under the state of the flow rate Q and the regulator pressure difference P. The movement of the control piston 445 after the first pilot chamber 4D is liquid-tightly closed correlates with the flow rate of the operating fluid which flows into or out of the first pilot chamber 4D. The deviating amount between the target servo pressure and the actual servo pressure (overshooting or undershooting) generated by the conventional control method correlates with the flow rate (or the gradient) of the operating fluid which flows into or out of the servo chamber 1A at the time when the target pressure difference becomes zero and the first pilot chamber 4D is liquid-tightly closed. It is noted that the gradient of the servo pressure is calculated based on the measured value of the pressure sensor 74.

Based on the principle explained above, the relationships among the hydraulic pressure change amount of the servo pressure, the regulator pressure difference P and the gradient (or the flow rate Q) of the servo pressure can be obtained by calculation or the experiment. These relationships are memorized in the brake ECU 6 as a map. For example, when the current servo pressure gradient and the current regulator pressure difference P one inputted, the hydraulic pressure change amount of the servo pressure thereby is outputted. The hydraulic pressure change amount corresponds to the change amount of the servo pressure generated by the displacement of the control piston 445 when the first pilot chamber 4D is liquid-tightly closed (when the pressure decreasing valve 41 and the pressure increasing valve 42 are in a closed state) in order to hold the servo pressure upon the control state of the brake control device being under the state of "the current servo pressure gradient" and "the current regulator pressure difference P". For example, under the state of "the current servo pressure gradient" and "the current regulator pressure difference P", when the actual pressure reaches to the target pressure, even the first pilot chamber 4D is liquid-tightly closed for holding the actual pressure, the actual pressure is nevertheless changed by "the hydraulic pressure change amount". In other words, the overshooting or the undershooting may be generated. It is noted that when "the hydraulic pressure change amount" which corresponds to the change amount of the actual pressure is the "target pressure difference", even the first pilot chamber 4D is liquid-tightly closed, theoretically, the actual pressure will not change beyond the target pressure. In other words, the "current servo pressure gradient" outputted by the inputs of the "current target pressure difference" as "the hydraulic pressure change amount" and the "the current regulator pressure difference P" in the map becomes the gradient which generates the change by "the current target pressure difference" in the servo chamber 1A when the first pilot chamber 4D is liquid-tightly closed by "the inputted hydraulic pressure gradient". When the hydraulic pressure change amount is used for the control, the deviation of the actual pressure relative to the target pressure, i.e., the overshooting or the undershooting can be suppressed.

It is noted that exampling the brake control (FB control) at the time of pressure increasing Further, the control means 61 inputs the "target pressure difference" which can be calculated from the pressure sensor 74 and the "regulator pressure difference" which can be calculated from the pressure sensors 74 and 75 on the map to output the "gradient of the servo pressure". The gradient of the servo pressure thus outputted means the maximum gradient that would not generate overshooting, even the actual servo pressure enters into the dead zone (control is switched over to the holding control) at this time point. Accordingly, the control means 61 controls the pressure increasing valve 42 so that the gradient of the pressure increasing becomes equal to or less than the outputted gradient of the servo pressure in every fixed time (or always). Considering the quick catching up, the control means 61 performs controlling with the outputted "gradient of the servo pressure".

It is noted here that according to the sixth embodiment, the control means 61 performs controlling of pressure increasing using not only the pressure increasing valve 42, but also the pressure decreasing valve 41. The map explained above is prepared under the premise that pressure decreasing valve 41 is closed under the pressure increasing control. On the other hand, according to the sixth embodiment, since the pressure decreasing valve 41 is used for pressure increasing control, the map based on the principle (hereinafter referred to as "second map") is prepared under the premise that the pressure decreasing valve 41 is open (for example, with opening degree a1, a2, . . . ) under the pressure increasing control.

Figure 6:
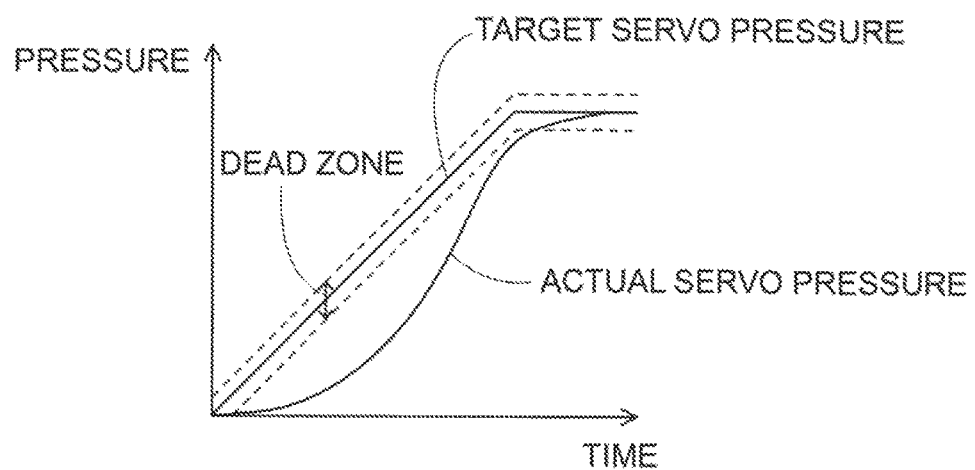
FIG. 6 is an explanatory view for explaining a gradient limiting control according to a sixth embodiment.

The "gradient of the servo pressure" under the pressure decreasing valve 41 being open is outputted on the second map. According to the second map, the pressure decreasing valve 41 can be opened and the gradient of the pressure increasing can be further lessened. Therefore, as shown in FIG. 6, according to the control which uses the second map, the gradient of the pressure increasing of the servo pressure in the process of the actual servo pressure being approximating the target servo pressure can be enlarged. In other words, according to the second map, the opening degree of the pressure increasing valve 42 can be widened.

Accordingly, until the servo pressure becomes the predetermined value, or until when the limiting necessity judging means 62 judges that the "gradient of the servo pressure should be limited", keeping the pressure decreasing valve 41 to be closed, the pressure increasing valve 42 is opened by the control electric current corresponding to the gradient of the servo pressure outputted on the second map. Thus, the opening degree of the pressure increasing valve 42 becomes wider than the case where the map is used and therefore, the actual servo pressure can quickly approximate the target servo pressure. When reached to the predetermined servo pressure, (or when judged that the gradient "should be limited"), the control means 61 opens the pressure decreasing valve 41 and controls the gradient of the servo pressure not to generate the overshooting based on the above principle.

The control means 61 controls the gradient of the servo pressure not only by opening the pressure increasing valve 42 but also by opening the pressure decreasing valve 41 (regulating the opening degree) every predetermined time period (or always), under the pressure increasing control. Thus, the gradient of the pressure increasing can be increased to improve the responsiveness of the brake operation and at the same time suppress the overshooting.

Other Embodiments

This invention is not limited to the embodiments as explained above and for example, instead of using the actual servo pressure for judging of the limiting necessity judging means 62, the pilot pressure may be used therefor. The value of the pilot pressure may either the value converted from the actual servo pressure or the value measured directly by the pressure sensor which is separately provided. In other words, the actual servo pressure correlation value may be any value that is corresponding to the actual servo pressure and may be the pilot pressure.

It is also noted that the valve opening timing of the pressure decreasing valve 41 in the gradient limiting control operation may be set to the time when the FB electric current decreases by a predetermined amount or the time when the gradient of the servo pressure decreases by a predetermined amount. In other words, the limiting necessity judging means 62 may judge whether the FB electric current decreases by a predetermined value or not, or whether the gradient of the servo pressure decreases by a predetermined amount or not.

It is also noted that the valve closing timing of the pressure decreasing valve 41 in the gradient limiting control operation may be set to the time when the pilot pressure becomes a predetermined pressure by providing a pressure sensor which can measure the pressure in the first pilot chamber 4D and monitoring the pilot pressure directly thereby. The predetermined pressure may be decided according to the difference between the target servo pressure and the actual servo pressure. Further, the limiting necessity judging means 62 may change the threshold values (first threshold value and second threshold value) in the gradient limiting control. The threshold values may be the values which change in response to the hysteresis presumption value. The hysteresis can be presumed from the gradient of the target pressure or the servo pressure or the like based on the principle explained above. Further, the first through fifth embodiments can be combined with one another and the second through sixth embodiments can be combined with one another.

A reference embodiment will be explained hereinafter with an example of pressure increasing control. The brake ECU 6 calculates the regulator flow rate (flow rate of the operating fluid flowing into the first pilot chamber 4D) necessary for pressure increasing operation based on the target servo pressure, the actual servo pressure and the target response time. Then, the brake ECU 6 calculates the regulator stroke (stroke of the control piston 445) necessary for realizing the calculated regulator flow rate based on the actual servo pressure and the accumulator pressure (measured value of the pressure sensor 75).

The brake ECU 6 closes the pressure increasing valve 42, even under the pressure increasing control, so that the stroke of the control piston 445 becomes the above regulator stroke after a predetermined time has elapsed. In other words, the brake ECU 6 closes the pressure increasing valve 42 under the pressure increasing control by setting the control electric current to the pressure increasing valve 42 to be less than the minimum valve opening electric current. Then, the brake ECU 6 opens the pressure increasing valve 42 again based on the FB control when the regulator stroke which is always or periodically calculated becomes increasing or constant. By controlling the pressure increasing valve 42 to be closed even under the pressure increasing control, the actual servo pressure can accurately approximate the target servo pressure.

Further, according to the reference embodiment, the timing when the brake ECU 6 closes the pressure increasing valve 42 may be the timing when the FB electric current decreases under the FB control of the servo pressure. The FB electric current (FB term) is an electric current set based on the deviation between the target servo pressure and the actual servo pressure among the control electric currents applied on the pressure increasing valve 42. It is noted that the control electric current is formed by the sum of the FB electric current and the minimum valve opening electric current (current decided by the difference between pressures at the input and output ports of the pressure increasing valve 42). The "FB electric current decreases" means that "the target servo pressure and the actual servo pressure are close to each other". Accordingly, the brake ECU 6 can close the pressure increasing valve 42 at the timing that the target servo pressure and the actual servo pressure become very close to each other by using the timing that the FB electric current has decreased as a trigger. Thus, the generation of the overshooting can be suppressed. The brake ECU 6 can similarly suppress the generation of the undershooting by closing the pressure decreasing valve 41 regarding to the pressure decreasing valve 41.

REFERENCE SIGNS LIST

1; master cylinder, 11; main cylinder, 12; cover cylinder 13; input piston, 14; first master piston, 15; second master piston, 1A; servo chamber (output chamber), 1B: first hydraulic pressure chamber, 1C; second hydraulic pressure chamber, 1D; first master chamber, 1E; second master chamber, 10; brake pedal, 171; reservoir (low pressure source) 2; reaction force generating device, 22; first control valve, 3; second control valve, 4; servo pressure generating device, 41; pressure decreasing valve (pressure decreasing electromagnetic valve), 42; pressure increasing valve (pressure increasing electromagnetic valve), 431; accumulator (high pressure source), 44; regulator (pressure adjusting device), 445; control piston (piston), 4D; first pilot chamber (pilot chamber), 541 through 544; wheel cylinder, 5FR, 5FL, 5RR and 5RL; wheel, BF; hydraulic pressure braking force generating device, 6; brake ECU, 61; control portion, 62; limiting necessity judging means, 71; stroke sensor, 72; brake stop switch, 74; pressure sensor (output pressure obtaining means).

The invention claimed is:

1. A vehicle brake device comprising:
   a pressure adjusting device configured to output an output pressure corresponding to a pilot pressure inputted into a pilot chamber into an output chamber;
   a high pressure source configured to accumulate a hydraulic pressure in a predetermined range;
   a low pressure source configured to accumulate a hydraulic pressure lower than the hydraulic pressure accumulated in the high pressure source;
   a pressure increasing electromagnetic valve configured to adjust a flow rate of a liquid flowing into the pilot chamber from the high pressure source;
   a pressure decreasing electromagnetic valve configured to adjust a flow rate of a liquid flowing into the low pressure source from the pilot chamber; and
   a control means configured to control the pressure increasing electromagnetic valve and the pressure decreasing electromagnetic valve, wherein
   the vehicle brake device further includes a limiting necessity judging means configured to judge whether a gradient of the output pressure should be limited or not, based on a target output pressure which is a control target of the control means and an actual output pressure correlation value which correlates with an actual output pressure;
   the pressure adjusting device configured to include a piston driven by a force generated by a difference between a force corresponding to the pilot pressure and a force corresponding to the output pressure, wherein a volume of the pilot chamber varies in response to a movement of the piston, a reference position of the piston being a position under a state that the force corresponding to the pilot pressure and the force corresponding to the output pressure are balanced and when the flow rate of the liquid flowing into or out of the pilot chamber increases, the movement of the piston from the reference position increases to thereby increase the flow rate of the liquid flowing into or out of the output chamber; and wherein
   the control means executes at least one of a pressure increasing gradient limiting control in which the pressure decreasing electromagnetic valve is opened under a pressure increasing control and a pressure decreasing gradient limiting control in which the pressure increasing electromagnetic valve is opened under a pressure decreasing control, when the limiting necessity judging means judges that the gradient of the output pressure should be limited.

2. The vehicle brake device according to claim 1, wherein the control means opens the pressure decreasing electromagnetic valve when executing the pressure increasing gradient limiting control and opens the pressure increasing electromagnetic valve when executing the pressure decreasing gradient limiting control, respectively by an opening degree corresponding to a deviation between the target output pressure and the actual output pressure correlation value.

3. The vehicle brake device according to claim 2, wherein the control means opens the pressure decreasing electromagnetic valve when executing the pressure increasing gradient limiting control and opens the pressure increasing electromagnetic valve when executing the pressure decreasing gradient limiting control, respectively by the opening degree further corresponding to a gradient of the output pressure.

4. The vehicle brake device according to claim 1, further comprising:
   an output pressure obtaining means configured to obtain an actual output pressure which is the pressure actually outputted, wherein
   the control means monitors the change of the actual output pressure obtained by the output pressure obtaining means while gradually increasing the opening degree of the pressure decreasing electromagnetic valve when executing the pressure increasing gradient limiting control or while gradually increasing the opening degree of the pressure increasing electromagnetic valve when executing the pressure decreasing gradient limiting control and closes the pressure increasing electromagnetic valve or the pressure decreasing electromagnetic valve in response to the change of the actual output pressure.

5. The brake device according to claim 1, further comprising:
   a valve opening time setting means configured to set a valve opening time of the pressure decreasing electromagnetic valve based on the deviation between the target output pressure and the actual output pressure correlation value, wherein the control means opens the pressure decreasing electromagnetic valve by the valve opening time when executing the pressure increasing gradient limiting control.

6. The brake device according to claim 1, further comprising:
   a valve opening time setting means configured to set a valve opening time of the pressure increasing electromagnetic valve based on the deviation between the target output pressure and the actual output pressure correlation value, wherein the control means opens the pressure increasing electromagnetic valve by the valve opening time when executing the pressure decreasing gradient limiting control.

7. The brake device according to claim 5, wherein the valve opening time setting means is configured to set the valve opening time further based on the gradient of the output pressure.

* * * * *